(12) United States Patent
Asano et al.

(10) Patent No.: US 6,678,177 B2
(45) Date of Patent: Jan. 13, 2004

(54) DRIVING METHOD OF A BRIDGE CIRCUIT FOR DRIVING AN INDUCTANCE LOAD

(75) Inventors: Kenji Asano, Toyota (JP); Takehiko Fushimi, Kariya (JP); Hiroyuki Ichikawa, Kani (JP)

(73) Assignees: Aisin Seiki Kabushiki Kaisha, Kariya (JP); Tokai Rubber Industries, Ltd., Komaki (JP)

( * ) Notice: Subject to any disclaimer, the term of this patent is extended or adjusted under 35 U.S.C. 154(b) by 31 days.

(21) Appl. No.: 10/152,045

(22) Filed: May 22, 2002

(65) Prior Publication Data

US 2002/0191419 A1 Dec. 19, 2002

(30) Foreign Application Priority Data

May 22, 2001 (JP) ........................................ 2001-153181
May 14, 2002 (JP) ........................................ 2002-138695

(51) Int. Cl.[7] .......................... H02M 3/24; H02M 7/5387
(52) U.S. Cl. .......................................... 363/98; 363/132
(58) Field of Search ............................... 363/16, 17, 97, 363/98, 131, 132

(56) References Cited

U.S. PATENT DOCUMENTS 5,872,703 A * 2/1999 Williams et al. ............. 363/17
5,952,856 A * 9/1999 Horiguchi et al. ........... 327/110
6,243,275 B1 * 6/2001 Ferencz ....................... 363/17
6,246,599 B1 * 6/2001 Jang et al. ................. 363/132

FOREIGN PATENT DOCUMENTS

| JP | 8-137556 A | 5/1996 |
| JP | 8-219227 A | 8/1996 |
| JP | 10-318326 A | 12/1998 |

* cited by examiner

Primary Examiner—Matthew V. Nguyen
(74) Attorney, Agent, or Firm—Burns, Doane, Swecker & Mathis, LLP (57) ABSTRACT

A driving system of a bridge circuit for driving an inductance load turns OFF one of switching elements on either an upper arm connected to a power supply or a lower arm connected to a ground and turns ON the other one of the switching elements on the same arm when a pulse width modulation signal is OFF when a phase difference occurs between an electric current of a control signal with a sine wave and a voltage and when a polarity of the electric current differs from a polarity of the voltage, wherein the electric current is circulated via the other one of the switching elements, the flywheel diode connected to the one of the switching elements, and the inductance load.

11 Claims, 7 Drawing Sheets

DRIVING METHOD OF A BRIDGE CIRCUIT FOR DRIVING AN INDUCTANCE LOAD

CROSS REFERENCE TO RELATED APPLICATIONS

This application is based on and claims priority under 35 U.S.C. §119 with respect to a Japanese Patent Application 2001-153181, filed on May 22, 2001, the entire content of which is incorporated herein by reference.

FIELD OF THE INVENTION

This invention generally relates to a method for driving a bridge circuit for driving an inductance load. More particularly, this invention pertains to a bridge circuit driving method being for appropriately driving a bridge circuit for driving an actuator of an active type vibration control system.

BACKGROUND OF THE INVENTION

Bridge circuits for driving an inductance load have been employed for various uses. A coil which forms an actuator of an active type vibration control system represents the inductance load. The active type vibration control system is disclosed, for example in a Japanese Laid-open Patent Publication (Kokai) No. 8(1996)-137556 and in another Japanese Laid-open Patent Publication (Kokai) No. 10(1998)-318326. Each active type vibration control system is applied to an automobile engine mount and offsets vibration of a vibration protecting object by applying an exciting force thereto. Further, a Japanese Laid-open Patent Publication (Kokai) No. 8(1996)-219227 discloses a bridge circuit including the coil forming the actuator of the active type vibration control system and a control means for controlling the bridge circuit.

The active type vibration control system disclosed in the Japanese Laid-open Patent Publication (Kokai) No. 8(1996)-219227 is provided with the bridge circuit parallelly connecting two sets of two switching elements. The two switching elements of the respective sets are connected to each other in series between a power supply and a ground. The coil forming the actuator is bridge-connected between connecting points of the switching elements of the respective sets. The active type vibration control system is further provided with a controller for comparing a detected value of an electric current flowing the coil with a set value for setting the electric current flowing the coil, for controlling the switching elements based upon the comparison result therebetween and an electric current polarity switch signal for switching the polarity of the electric current flowing the coil, and for controlling the polarity of the electric current flowing the coil lead wire and the electric current value thereof.

Generally, a bridge circuit for driving the inductance load such as the actuator having the coil is provided with a flywheel diode arranged in parallel with each switching element. The bridge circuit disclosed in the Japanese Laid-open Patent Publication (Kokai) No. 8(1996)-219227 is not described in detail with respect to the above structure. For example, energy is accumulated in the inductance of a load circuit in response to switching the polarity of the power source by the switching elements. The flywheel diode is hence provided for each switching element for effectively protect each switching element from being damaged due to the energy accumulated in the inductance. However, each switching element and each flywheel diode may not be operated following a desired mode depending on a driving signal supplied to each switching element.

For example, according to the active type vibration control system, a pulse-width modulation (PWM) can be applied to a control signal with a sine wave for generating vibration with an opposite phase relative to vibration of a controlled object. Meanwhile, the electric current may be deformed due to occurrence of counter electromotive force when directions (or polarities (positive or negative)) of a voltage and an electric current with respect to a voltage—current phase characteristics are not identical to each other. In such a case, undesired vibration may occur due to harmonic content. The deformation of the electric current is described later with reference to FIG. 10 and FIG. 11.

According to the Japanese Laid-open Patent Publication (Kokai) No. 8(1996)-219227, the electric current becomes the sine wave by an electric current feedback control. However, the voltage is alternately required to be reversed within a range in which the directions (or the polarities) of the voltage and the electric current with respect to the voltage—current phase characteristics are not identical. In such a case, highly cost switching elements are required to compensate for large loss of the switching elements. Further, the highly cost switching elements lead to a cost increase of the bridge circuit. The above described drawbacks are associated not only with the bridge circuit of the active type vibration control system but also with other bridge circuits for driving the inductance load such as the actuator including the coil.

Accordingly, the above disclosed bridge circuits for driving the inductance load are still susceptible of certain improvements with respect to properly protecting each switching element forming the bridge circuit and supplying a method for driving the bridge circuit in which a stable PWM driving can be carried out.

SUMMARY OF THE INVENTION

According to an aspect of the present invention, a method for driving a bridge circuit for driving an inductance load comprises the bridge circuit having a first circuit having a first pair of switching elements arranged in series, a second circuit having a second pair of switching elements arranged in series, a first connecting point for connecting the first circuit and the second circuit, a second connecting point for connecting the first circuit and the second circuit, an inductance load, fly diodes connected to the respective switching elements in parallel. The first connecting point is connected to a power supply and the second connecting point is connected to a ground. The inductance load is connected to an intermediate connecting point between the first pair of switching elements of the first circuit and an intermediate connecting point between the second pair of switching elements of the second circuit. The method for driving the bridge circuit for driving the inductance load in response to a pulse width modulation signal which modulates a control signal with a sine wave by the pulse width modulation turns OFF one of the switching elements on either an upper arm of the bridge circuit connected to the power supply or a lower arm thereof connected to the ground and turns ON the other one of the switching elements on the same arm thereof when the pulse width modulation signal is OFF under the state where a phase difference occurs between an electric current of the control signal with the sine wave and a voltage and where a polarity of the electric current differs from a polarity of the voltage, wherein the electric current is circulated via the other one of the switching elements, the flywheel diode connected to the one of the switching elements, and the inductance load.

According to another aspect of the present invention, the method for driving the bridge circuit for driving the inductance load in response to the pulse width modulation signal which modulates the control signal with the sine wave by the pulse width modulation further comprises turns OFF all the switching elements when the pulse width modulation signal is ON under the state where the phase difference occurs between the electric current of the control signal with the sine wave and the voltage and where the polarity of the electric current differs from the polarity of the voltage.

According to further aspect of the present invention, the method for driving the bridge circuit for driving the inductance load in response to the pulse width modulation signal which modulates the control signal with the sine wave by the pulse width modulation further comprises a means for correcting a duty of the pulse width modulation signal in response to a forward drop of a voltage of the flywheel diode.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
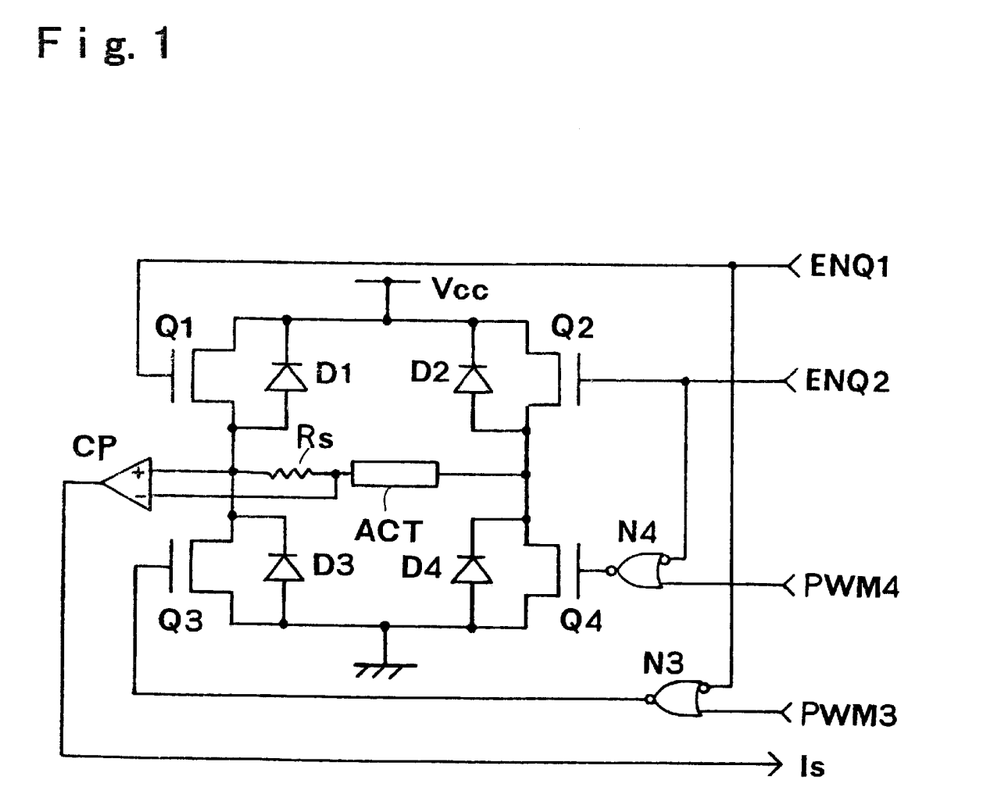
FIG. 1 is a circuit diagram schematically illustrating a bridge circuit according to an embodiment of the present invention.

Referring to FIG. 1, a bridge circuit according to an embodiment of the present invention includes a circuit connecting a MOS field effect transistor (hereinafter, referred to as FET) Q1 and another MOS field effect transistor (hereinafter, referred to as FET) Q3 in series and another circuit connecting a MOS field effect transistor (hereinafter, referred to as FET) Q2 and another MOS field effect transistor (hereinafter, referred to as FET) Q4 in series. The two circuits are connected in parallel to each other. One connecting point of the two circuits is connected to a power supply Vcc and another connecting point thereof is connected to a ground. An actuator ACT including a coil (not shown) as an inductance load is bridge-connected between an intermediate connecting point of the FETs Q1, Q3 and another intermediate connecting point of the FETs Q2, Q4. The FETs Q1, Q2, Q3, Q4 are connected to flywheel diodes D1, D2, D3, D4 in parallel, respectively.

The FETs Q1, Q2 provided on an upper arm at a side of the power supply Vcc are respectively formed of a P-channel FET and receive control signals ENQ1 and ENQ2, respectively. The FETs Q3 and Q4 provided on a lower arm at a side of the ground are respectively formed of an N-channel FET and are respectively connected to output terminals of NOR gates N3 and N4. The NOR gate N3 having two input terminals receives a reversed control signal ENQ1 via one of the two input terminals and receives a pulse width modulation signal (hereinafter, referred to as PWM) 3 via another one of the two input terminals. The NOR gate N4 having two input terminals receives a reversed control signal ENQ2 via one of the two input terminals and receives a pulse width modulation signal (hereinafter, referred to as PWM) 4 via another one of the two input terminals.

A resistance Rs is disposed between the intermediate connecting point of the FETs Q1, Q3 and the actuator ACT. Both ends of the resistance Rs are connected to input terminals of a comparator CP. A detecting signal Is is outputted from an output terminal of the comparator CP. The detecting signal Is is employed for judging whether or not an electric current supplied to the actuator ACT is greater than a predetermined threshold electric current value. Assuming that the predetermined threshold electric current value is preset at zero, the electric current can be judged whether to be positive or negative.

The FET Q1 is turned ON when the control signal ENQ1 is an L-level (low level) and the FET Q1 is turned OFF when the control signal ENQ1 is an H-level (high level). The FET Q3 is turned OFF regardless of the level of the PWM3 when the control signal ENQ1 is the L-level, i.e. when the FET Q1 is ON. Further, the FET 03 is turned OFF when the ENQ1 is the H-level, i.e. when the FET Q1 is OFF, and when the PWM3 is the H-level. On the other hand, the FET Q3 is turned ON when the ENQ1 is the H-level, i.e. when the FET Q1 is OFF, and when the PWM3 is the L-level. The FET Q2 is turned ON when the control signal ENQ2 is the L-level. In this case, the FET Q4 is turned OFF regardless of the level of the PWM4. On the other hand, the FET Q2 is turned OFF when the control signal ENQ2 is the H-level. In this case, the FET Q4 is turned OFF when the PWM4 is the H-level. On the other hand, the FET Q4 is turned ON when the PWM4 is the L-level.

Hereinafter, the ENQ1 is defined to be ON when the ENQ1 is L-level and the ENQ1 is defined to be OFF when the ENQ1 is H-level. The PWM3 is defined to be OFF when the PWM3 is the H-level and the PWM3 is defined to be ON when the PWM3 is the L-level. The ENQ2 is defined to be ON when the ENQ2 is the L-level and the ENQ2 is defined to be OFF when the ENQ2 is the H-level. The PWM4 is defined to be OFF when the PWM4 is the H-level and the PWM4 is defined to be ON when the PWM4 is the L-level.

Figure 7:
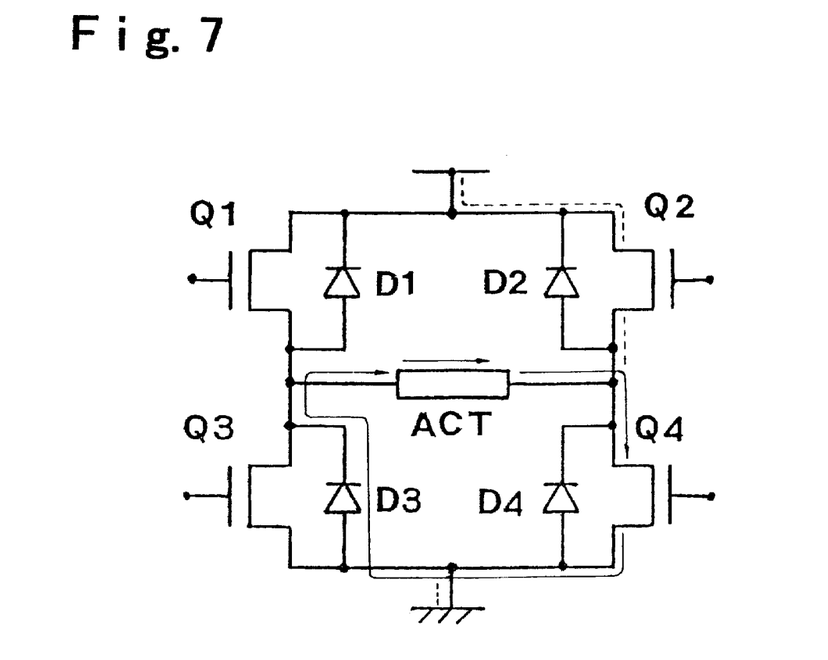
FIG. 7 is a circuit diagram describing further example of the electric current controlled by the pulse wide modulation applied to the bridge circuit according to the embodiment of the present invention.

For example, a phase difference occurs between the electric current of a control signal with a sine wave and the voltage. In other words, the polarity of the electric current of the control signal with the sine wave differs from the polarity of the voltage. In this case, assuming that either PWM3 or PWM4 is OFF, one of the switching elements on either the upper arm of the bridge circuit or the lower arm is turned OFF and the other one of the switching elements on the arm is turned ON. Therefore, the electric current is controlled to be circulated via the other one of the switching elements, the flywheel diode, and the actuator ACT. For example, when the phase difference between the electric current and the voltage occurs under the state where the ENQ2 and the PWM3 are ON, the electric current can be circulated via the flywheel diode D3, the actuator ACT, and the FET Q4 by turning OFF the FETs Q2, Q3 and by turning ON the FET Q4 as illustrated in FIG. 7.

Figure 6:
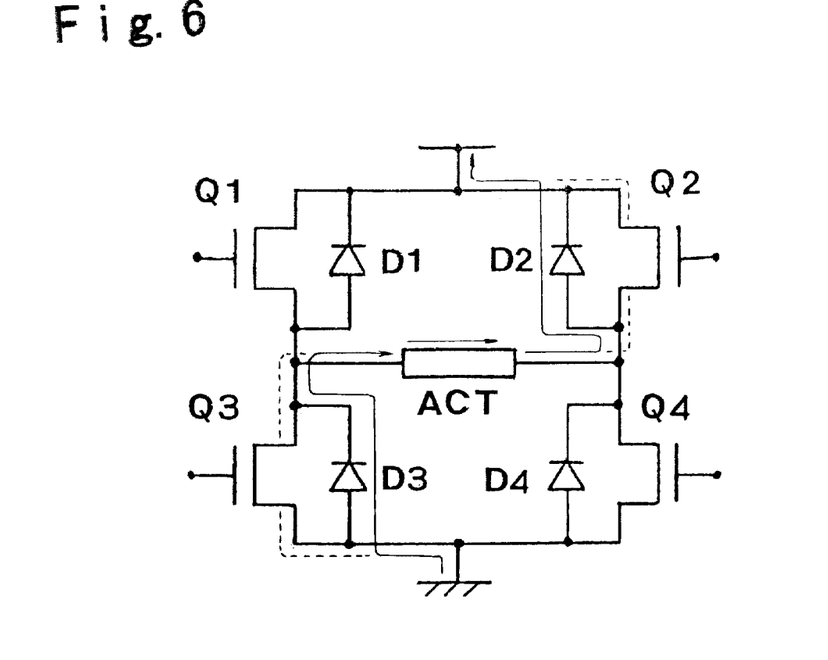
FIG. 6 is a circuit diagram describing further example of the electric current controlled by the pulse wide modulation applied to the bridge circuit according to the embodiment of the present invention.

Further, assuming that either PWM3 or PWM4 are ON under the condition that the polarity of the electric current of the control signal with the sine wave differs from the polarity of the voltage due to the phase difference between the electric current and the voltage, all switching elements (FETs Q1 through Q4) are operatively turned OFF. Therefore, as illustrated in FIG. 6, the electric current is returned to the power supply Vcc via the flywheel diodes (e.g. D2 and D3) and the actuator ACT. The electric current return to the power supply Vcc is described later with reference to FIG. 6. Further, it is preferable that duty of the PWM3 or the PWM4 is corrected in response to a forward drop of the voltage of the flywheel diodes (e.g. D2 and D3).

Figure 2:
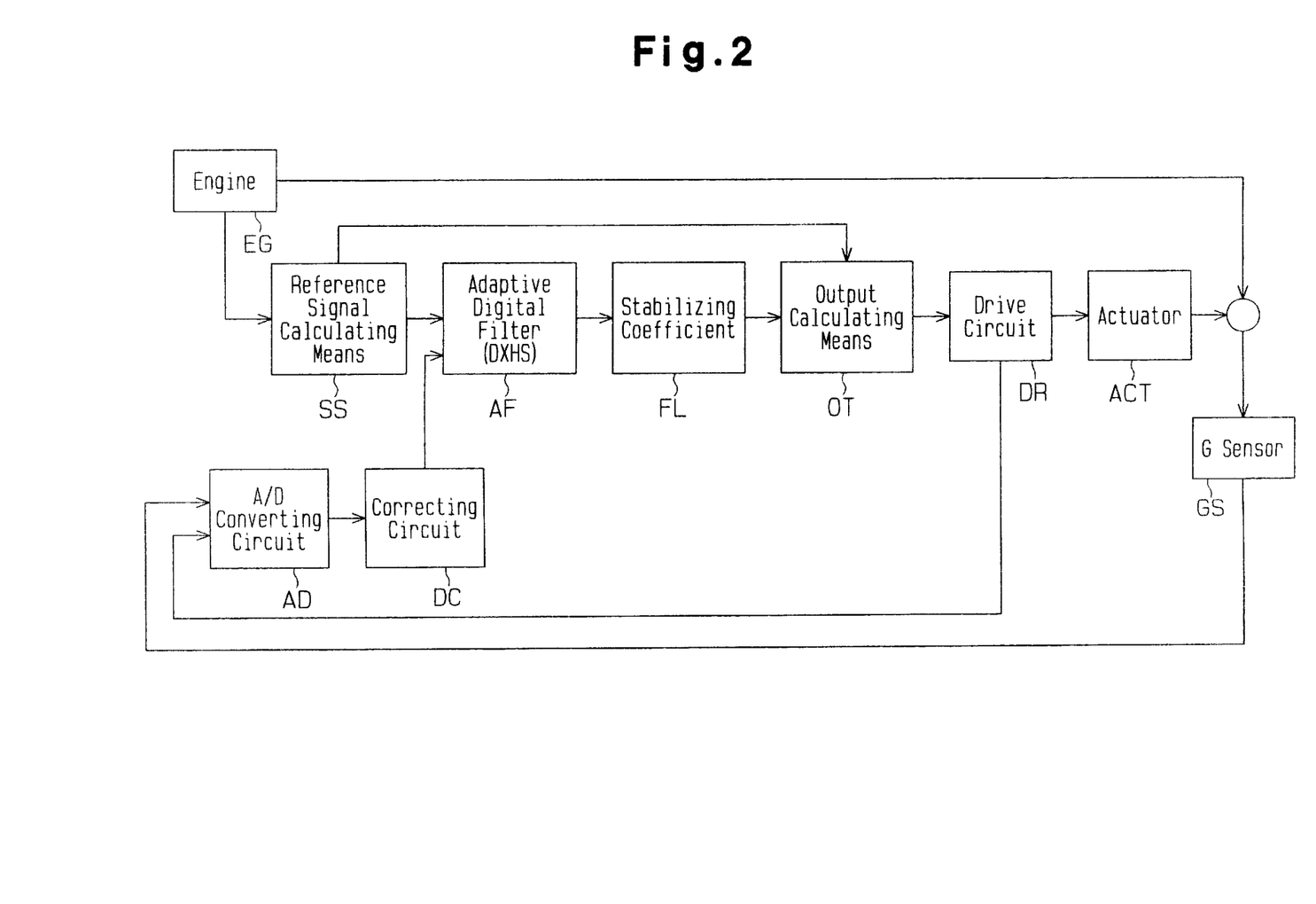
FIG. 2 is a block view illustrating an active type vibration control system provided with the bridge circuit according to the embodiment of the present invention.

Next, the operation of the active type vibration control system according to the embodiment of the present invention is described with reference to FIG. 2. The active type vibration control system illustrated in FIG. 2 is provided with the bridge circuit with the aforementioned structure. The bridge circuit is included in a driving circuit DR. The active type vibration control system according to the embodiment of the present invention is substantially the same as the vibration control system disclosed in the Japanese Patent Laid-open Publication No. 10(1998)-318326. The actuator ACT is mounted on an engine mount (not shown) for supporting a vehicle engine EG. A vibration with an opposite phase to a vibration of the engine EG is applied to the engine EG by the actuator ACT so as to offset the vibration of the engine EG.

A crank angle signal of the vehicle engine EG as a vibration source is detected by a rotational sensor (not shown). A reference signal having frequency content corresponding to a vibration of the controlled object is calculated by a reference signal calculating means SS. The calculated reference signal is supplied to an adaptive digital filter AF (e.g. Delayed X Harmonics Synthesizer, i.e. DXHS) and to an output calculating means OT. The adaptive digital filter AF serves for updating a filter coefficient of the digital filter at a high speed by an adaptive algorism. On the other hand, a vehicle body (a vibration protecting object) is provided with an acceleration sensor (G sensor) GS so as to detect an error signal corresponding to a residual vibration of the vehicle body. The error signal is converted to a digital signal by an A/D converting circuit AD. The digital signal is supplied to the adaptive digital filter AF after being corrected by a correcting circuit DC.

As described above, the adaptive digital filter AF is supplied with the reference signal of the frequency content corresponding to the vibration of the controlled object from the reference signal calculating means SS. Further, the adaptive digital filter AF is supplied with the error signal corresponding to the residual vibration detected by the G sensor GS from the correcting circuit DC. The adaptive digital filter AF updates the filter coefficient so as to set the error signal at zero. The actuator can be then controlled in an appropriate manner.

The output of the adaptive digital filter AF is supplied to the output calculating means OT after being stabilized via a filter FL. A sine wave control signal with a frequency corresponding to the vibration of the controlled object is set by the output calculating means OT based upon an output control signal transmitted from the adaptive digital filter AF via the filter FL and the reference signal calculated by the reference signal calculating means SS. Further, a value of the pulse width modulation signal (Pwmt) corresponding to the polarity of the sine wave control signal is calculated by the output calculating means OT. Therefore, the actuator ACT is driven with the pulse width modulation by the driving circuit DR based upon the control signal.

As described above, a vibration with an opposite phase to the vibration of the engine EG can be outputted by the actuator ACT so that the vibration of the engine EG can be offset by the vibration with the opposite phase to the vibration of the engine EG. The structure of the actuator ACT is substantially the same as the structure thereof disclosed in the Japanese Pant Laid-open Publication No. 8(1996)-137556.

Figure 3:
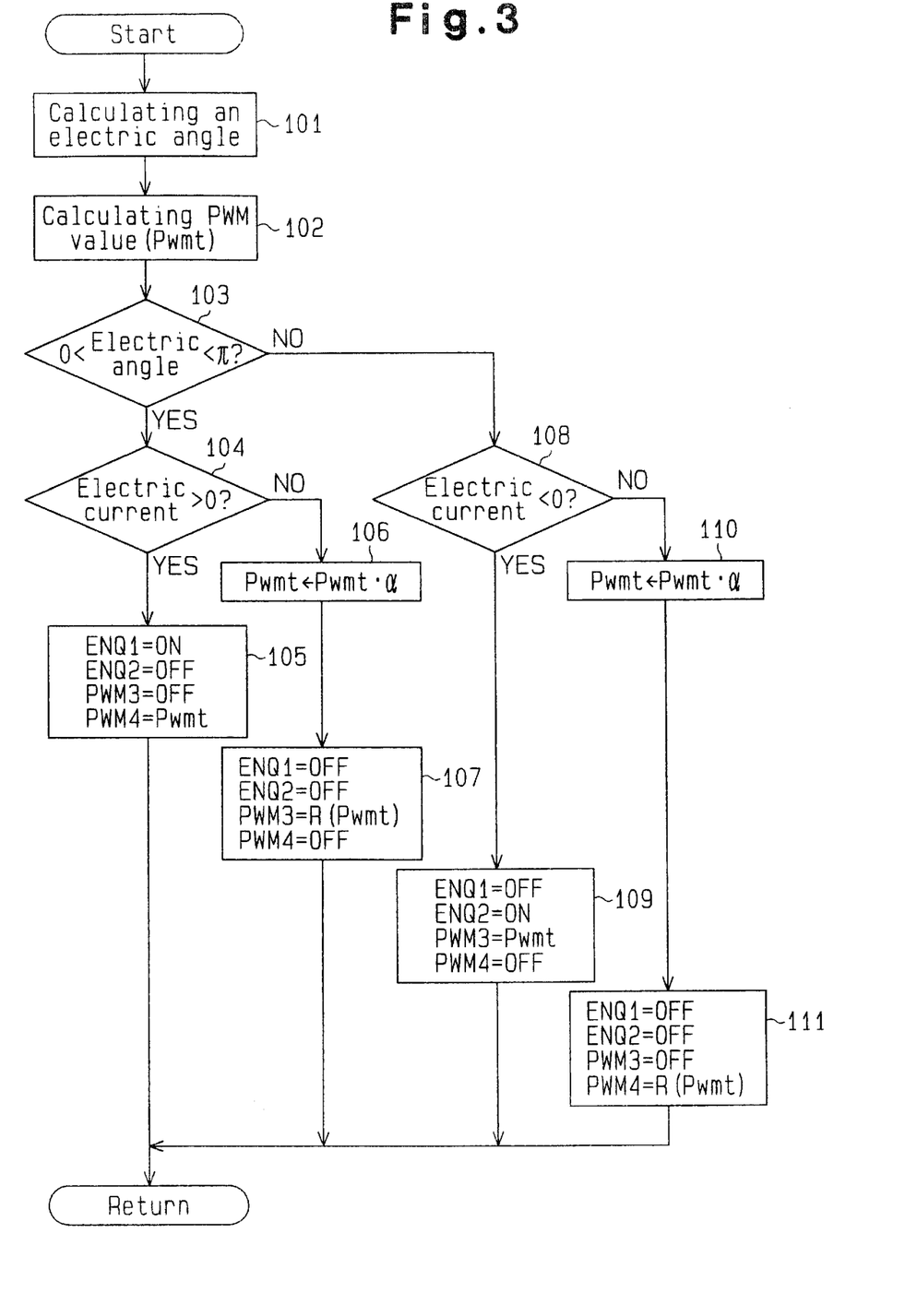
FIG. 3 is a flow chart showing a part of a control by a pulse width modulation applied to the bridge circuit illustrated in FIG. 1.
Figure 4:
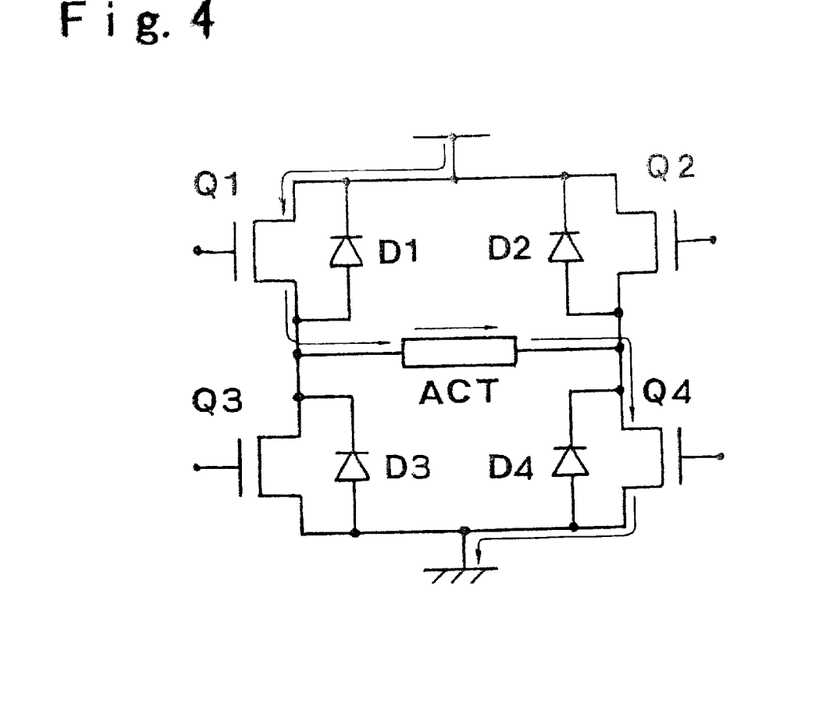
FIG. 4 is a circuit diagram describing an example of an electric current controlled by the pulse wide modulation applied to the bridge circuit according to the embodiment of the present invention.
Figure 5:
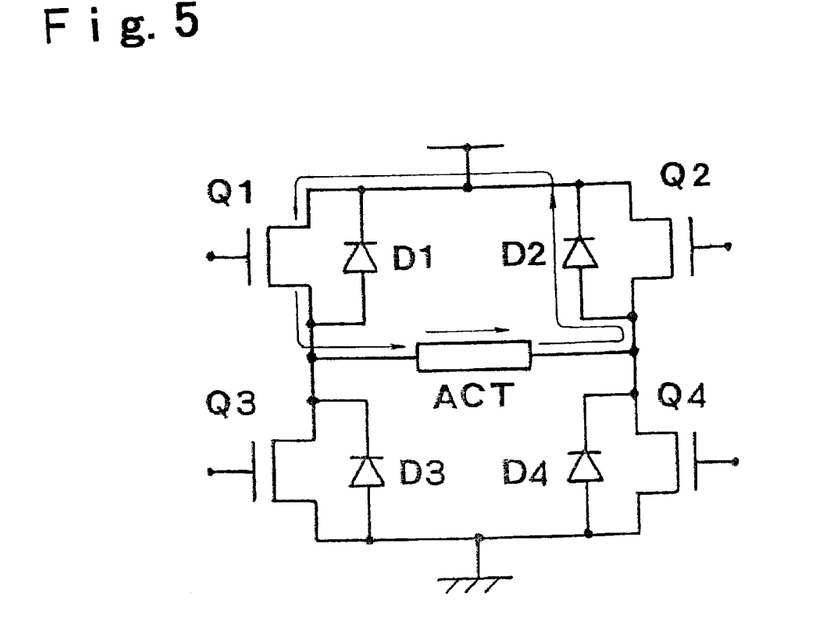
FIG. 5 is a circuit diagram describing another example of the electric current controlled by the pulse wide modulation applied to the bridge circuit according to the embodiment of the present invention.

Next, a control operation by the pulse width modulation according to the active type vibration control system is described following a flow chart illustrated in FIG. 3 with reference to FIGS. 1, 2, 4, 5, 6, 7.

At step 101, the output calculating means OT calculates an electric angle of the output control signal of the adaptive digital filter AF. At step 102, the output calculating means OT calculates the value of the pulse width modulation signal (Pwmt). At step 103, the electric angle of the output control signal is judged whether or not to be within a range between zero and $\pi$. When the electric angle of the output control signal is judged to be within the range therebetween, i.e. when the output control signal is judged to be positive, the program proceeds to step 104 so as to judge whether or not a polarity of a driving electric current (hereinafter, referred to as an electric current) of the actuator ACT is to be positive based upon the detected electric current Is outputted from the output terminal of the comparator CP. When the electric current is judged to be positive at step 104, i.e. when both the output control signal and the electric current are positive, the program proceeds to step 105. At step 105, the electric current is controlled by the pulse width modulation under the normal condition. That is, when the control signal ENQ1 is ON and the control signal ENQ2 is OFF, the PWM3 is turned OFF. Further, the PWM4 is turned ON or OFF based upon the value of the pulse width modulation signal (Pwmt) calculated at step 102.

Figure 8:
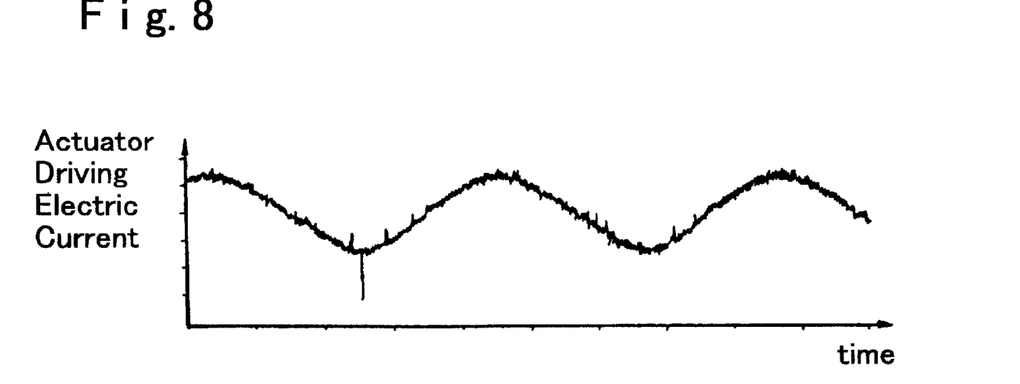
FIG. 8 is a graph showing an example of a driving electric current upon driving an actuator by the bridge circuit according to the embodiment of the present invention.
Figure 9:
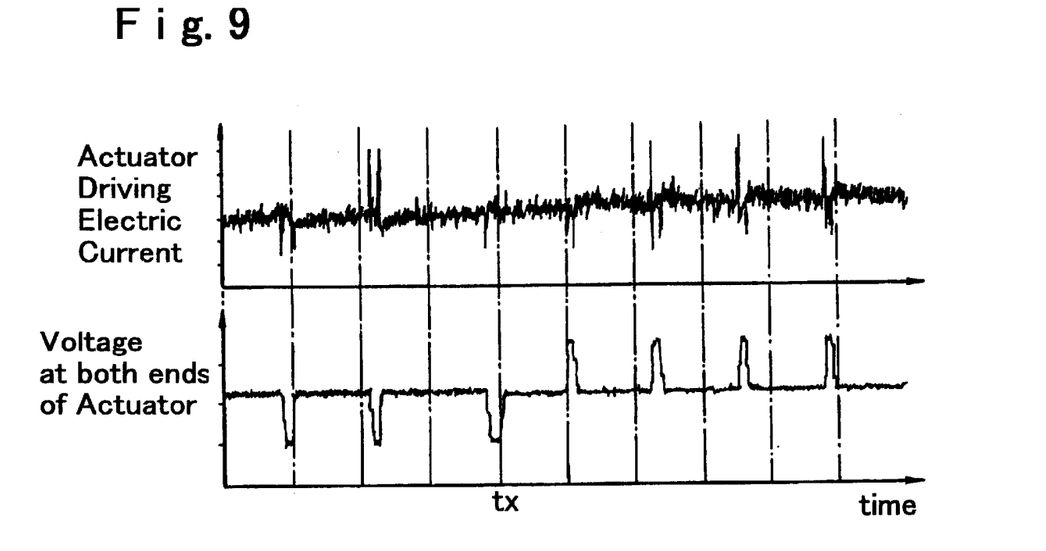
FIG. 9 shows a waveform of the driving electric current of the actuator and a voltage thereof, wherein the upper portion of FIG. 9 enlarges the driving electric current of the actuator illustrated in FIG. 8 and the lower portion thereof shows the voltage at both ends of the actuator.

In other words, the FET Q1 is turned ON and the FETs Q2, Q3 are turned OFF. Therefore, under the above condition, the electric current flows as illustrated by an arrow in FIG. 4 when the PWM4 is ON. On the other hand, the electric current flows via the flywheel diode D2 as illustrated by an arrow in FIG. 5 when the PWM4 is OFF. Therefore, the electric current of the actuator ACT becomes an accurate sine wave signal as illustrated in FIG. 8. That is, referring to FIG. 9, the voltage is reversed after reaching zero value instantly at time tx at which the polarity is switched. FIGS. 8, 9 illustrate an example of a waveform of the electric current of the actuator ACT and the voltage when an electric current phase delay occurs at 12 Hz. However, the same preferable effects can be obtained even when the electric current phase progress occurs.

On the other hand, when the electric current of the actuator ACT is judged to be negative, the program proceeds to step 106 so as to multiply the value of the pulse width modulation signal (Pwmt) by a correcting coefficient $\alpha(\alpha \leq 1)$. The correcting coefficient $\alpha$ is determined based upon the forward drop of the voltage of the flywheel diodes (D1 and D4, or D2 and D3). The value of the pulse width modulation signal (Pwmt) is corrected by the correcting coefficient $\alpha$. That is, the duty of the pulse width modulation signal is corrected.

The program then proceeds to step 107. At step 107, the PWM3 is controlled to be turned ON/OFF based upon a reverse value of the corrected value Pwmt (=Pwmt·$\alpha$). The reverse value is represented by R in FIG. 3. In this case, the control signals ENQ1, ENQ2 and the PWM4 are all turned OFF. Alternatively, the operation at step 106 can be omitted. In this case, the control signals ENQ1, ENQ2, and the PWM3, the PWM4 are all turned OFF. That is, the FETs Q1, Q2, Q3, Q4 are all turned OFF.

On the other hand, when the electric angle of the output control signal of the adaptive digital filter AF is judged to be beyond the range between zero and $\pi$ at step 103, for example when the polarity of the output control signal beyond the range therebetween is negative, the program proceeds to step 108. When the electric current is judged to be negative, i.e. when both the electric current and the polarity of the output control signal are negative, the program proceeds to step 109 so as to control the actuator ACT by the pulse width modulation under the normal condition. That is, when the control signal ENQ1 is OFF and the control signal ENQ2 is ON, the PWM4 is turned OFF. In this case, the PWM3 is controlled to be turned ON/OFF based upon the value of the pulse width modulation signal (Pwmt) calculated at step 102.

On the other hand, when the electric current is judged to be positive at step 108, the program proceeds to step 110 so as to multiply the value of the pulse width modulation signal (Pwmt) by the correcting coefficient $\alpha$, wherein the value of the pulse width modulation signal (Pwmt) is corrected. The program them proceeds to step 111. At step 111, the PWM4 is controlled to be turned ON/OFF based upon a reverse value R (=Pwmt·$\alpha$). In this case, the control signals ENQ1, ENQ2 and the PWM3 are all turned OFF.

In other words, the FETs Q1, Q2, Q3 are turned OFF. Therefore, under the above condition, the electric current flows as illustrated by an arrow in FIG. 6 when the PWM4 is OFF and the electric current value flows via the flywheel diode D3 as illustrated by an arrow in FIG. 7 when the PWM4 is ON. Therefore, the electric current of the actuator ACT becomes an accurate sine wave signal as illustrated in FIG. 8.

Alternatively, the operation at step 110 can be omitted as well as step 106 in FIG. 3. In this case, the control signals ENQ1, ENQ2, and the PWM3, the PWM4 are all turned OFF. That is, the FETs Q1, Q2, Q3, Q4 are all turned OFF.

Each broken line illustrated in FIGS. 6, 7 represents the flow of the electric current controlled by a known control method. For example, according to FIG. 7 in which the electric current flow is illustrated by the broken line, the voltage applied to the actuator ACT can not be set at zero. Therefore, as illustrated in FIGS. 10, 11, an appropriate driving signal may not be obtained within a range in which the polarity of the sine wave is changed.

Figure 10:
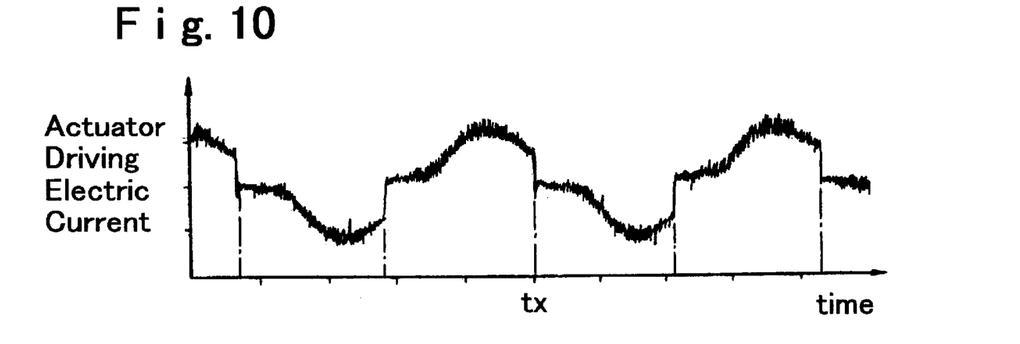
FIG. 10 is a graph showing an example of a driving electric current upon driving an actuator by a bridge circuit according to a known driving method.
Figure 11:
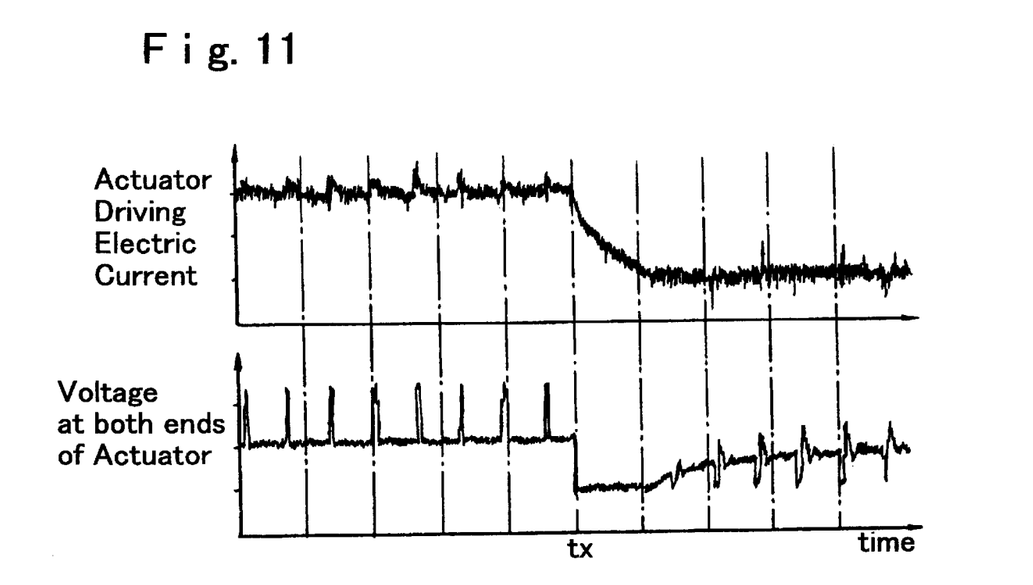
FIG. 11 shows a waveform of the driving electric current of the actuator and a voltage thereof, wherein the upper portion of FIG. 11 enlarges the driving electric current of the actuator illustrated in FIG. 10 and the lower portion thereof shows the voltage at both ends of the actuator.

As illustrated in FIG. 10, abnormal fluctuation occurs at the time tx at which the polarity of the sine wave control signal is switched. More particularly, referring to FIG. 11, the electric current of the actuator ACT is slowly decreased after the time tx. The voltage at both ends of the actuator ACT can not be returned to zero instantly at the time tx and is returned to zero at a slow speed.

As described above, the driving method of the bridge circuit according to the embodiment of the present invention effectively assures preferable characteristics between the electric current of the actuator ACT and the voltage as illustrated in FIGS. 8, 9.

According to the embodiment of the present invention, the FETs Q3, Q4 provided on the lower arm of the bridge circuit are controlled by the pulse width modulation signal. Alternatively, the FETs Q1, Q2 provided on the upper arm thereof can be controlled thereby.

Further, the embodiment of the present invention is applied to the bridge circuit driving the actuator of the active type vibration control system. Alternatively, the present invention can be applied to the bridge circuit driving the inductance load such as a stepping motor.

Further, the inductance load according to the embodiment of the present invention is the actuator ACT having the coil. Alternatively, the inductance load can be a stepping motor.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A method for driving a bridge circuit for driving an inductance load, comprising:
   the bridge circuit having:
       a first circuit having a first pair of switching elements arranged in series;
       a second circuit having a second pair of switching elements arranged in series;
       a first connecting point for connecting the first circuit and the second circuit;
       the first connecting point connected to a power supply;
       a second connecting point for connecting the first circuit and the second circuit;
       the second connecting point connected to a ground;
       an inductance load connected to an intermediate connecting point between the first pair of switching elements of the first circuit and an intermediate connecting point between the second pair of switching elements of the second circuit; and
       flywheel diodes connected to the respective switching elements in parallel;

the method for driving the bridge circuit for driving the inductance load in response to a pulse width modulation signal which modulates a control signal with a sine wave by the pulse width modulation, and including a means for turning OFF one of the switching elements on either an upper arm of the bridge circuit connected to the power supply or a lower arm thereof connected to the ground and for turning ON the other one of the switching elements on the same arm thereof when the pulse width modulation signal is OFF under the state where a phase difference occurs between an electric current of the control signal with the sine wave and a voltage and where a polarity of the electric current differs from a polarity of the voltage, wherein the electric current is circulated via the other one of the switching elements, the flywheel diode connected to the one of the switching elements, and the inductance load.

2. The method for driving the bridge circuit for driving the inductance load in response to the pulse width modulation signal which modulates the control signal with the sine wave by the pulse width modulation, according to claim 1, further comprising:

a means for turning OFF all the switching elements when the pulse width modulation signal is ON under the state where the phase difference occurs between the electric current of the control signal with the sine wave and the voltage and where the polarity of the electric current differs from the polarity of the voltage.

3. The method for driving the bridge circuit for driving the inductance load in response to the pulse width modulation signal which modulates the control signal with the sine wave by the pulse width modulation, according to claim 2, further comprising:

a means for correcting a duty of the pulse width modulation signal in response to a forward drop of a voltage of the flywheel diode when the pulse width modulation signal is ON under the state where the phase difference occurs between the electric current of the control signal with the sine wave and the voltage and where the polarity of the electric current differs from the polarity of the voltage.

4. The method for driving the bridge circuit for driving the inductance load in response to the pulse width modulation signal which modulates the control signal with the sine wave by the pulse width modulation, according to claim 3, wherein the pulse width modulation signal is turned ON and OFF based upon a reversed value of the corrected duty of the pulse width modulation signal.

5. The method for driving the bridge circuit for driving the inductance load, according to claim 1, wherein the inductance load is an actuator having a coil.

6. The method for driving the bridge circuit for driving the inductance load, according to claim 1, wherein the inductance load is a stepping motor.

7. A driving system for driving an inductance load, comprising:

a bridge circuit having:
a first arm having a first switching element and a second switching element in parallel to each other;
a second arm having a first switching element and a second switching element in parallel to each other;
the first arm and the second arm arranged in series;
a first connecting point between the first switching element on the first arm and the second switching element thereon;
the first connecting point connected to a power supply;
a second connecting point between the first switching element on the second arm and the second switching element thereon;
the second connecting point connected to a ground;
an inductance load connected to an intermediate connecting point between each first switching element on each first and second arm and connected to an intermediate connecting point between each second switching element on each first and second arm;
flywheel diodes connected to the respective switching elements in parallel;
an electric current estimating means for estimating a direction of an electric current flowing the inductance load; and
a control circuit for driving the inductance load in response to a pulse width modulation signal which modulates a control signal with a sine wave by the pulse width modulation including:
a means for applying an ON/OFF control signal corresponding to the control signal with the sine wave to the first switching element on either the first arm or the second arm and for applying the pulse width modulation signal to the second switching element on the other arm;
a means for turning OFF the first switching element applied with the ON/OFF control signal, for turning OFF the second switching element applied with the pulse width modulation signal, and for applying a reversed value of the pulse width modulation signal to the first switching element on the same arm as the arm having the second switching element applied with the pulse width modulation signal when a phase difference is determined to have occurred between a voltage applied to the inductance load and an electric current flowing the inductance load and when a polarity of the electric current is determined to be different from a polarity of the voltage based upon the direction of the electric current flowing the inductance load estimated by the electric current estimating means.

8. A driving system for driving an inductance load, according to claim 7, further comprising:

the control circuit including:
a means for correcting a duty of the pulse width modulation signal in response to a forward drop of a voltage of the flywheel diode when the phase difference is determined to have occurred between the voltage applied to the inductance load and the electric current flowing the inductance load and when the polarity of the electric current is determined to be different from the polarity of the voltage based upon the direction of the electric current flowing the inductance load estimated by the electric current estimating means; and
a means for applying with the reversed value of the corrected duty of the pulse width modulation signal to the first switching element on the same arm as the arm having the second switching element applied with the pulse width modulation signal.

9. A method for driving a bridge circuit for driving an inductance load, comprising:

the bridge circuit having:
a first circuit having a first pair of switching elements arranged in series;
a second circuit having a second pair of switching elements arranged in series;
a first connecting point for connecting the first circuit and the second circuit;
the first connecting point connected to a power supply;
a second connecting point for connecting the first circuit and the second circuit;

the second connecting point connected to a ground;

an inductance load connected to an intermediate connecting point between the first pair of switching elements of the first circuit and an intermediate connecting point between the second pair of switching elements of the second circuit; and flywheel diodes connected to the respective switching elements in parallel;

the method for driving the bridge circuit for driving the inductance load in response to a pulse width modulation signal which modulates a control signal with a sine wave by the pulse width modulation, and including a means for turning OFF all the switching elements when the pulse width modulation signal is ON under the state where the phase difference occurs between the electric current of the control signal with the sine wave and the voltage and where the polarity of the electric current differs from the polarity of the voltage.

10. The method for driving the bridge circuit for driving the inductance load in response to the pulse width modulation signal which modulates the control signal with the sine wave by the pulse width modulation, according to claim 9, further comprising:

a means for correcting a duty of the pulse width modulation signal in response to a forward drop of a voltage of the flywheel diode.

11. The method for driving the bridge circuit for driving the inductance load in response to the pulse width modulation signal which modulates the control signal with the sine wave by the pulse width modulation, according to claim 10, wherein the pulse width modulation signal is turned ON and OFF based upon a reversed value of the corrected duty of the pulse width modulation signal.

* * * * *